UNITED STATES PATENT OFFICE.

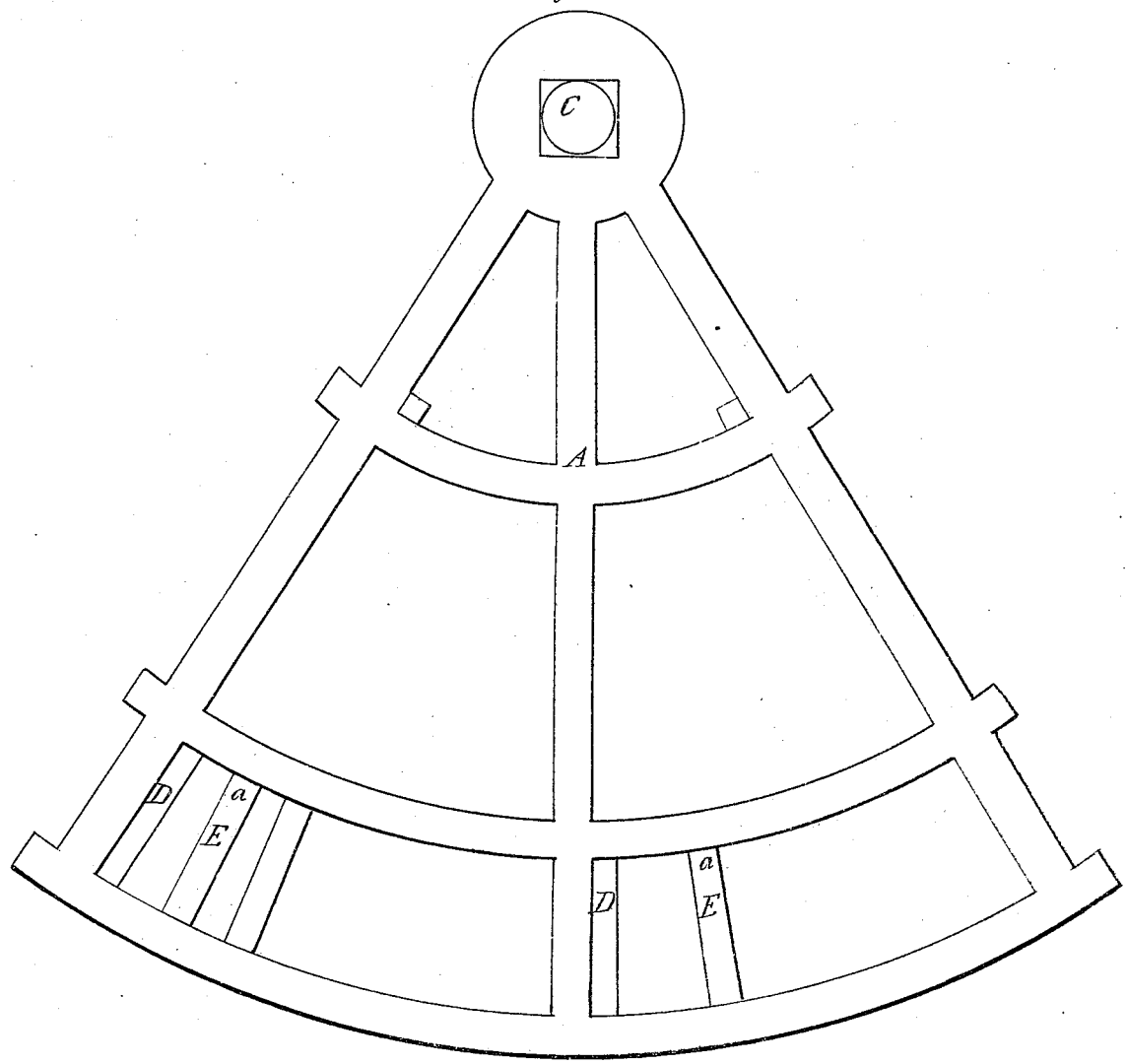

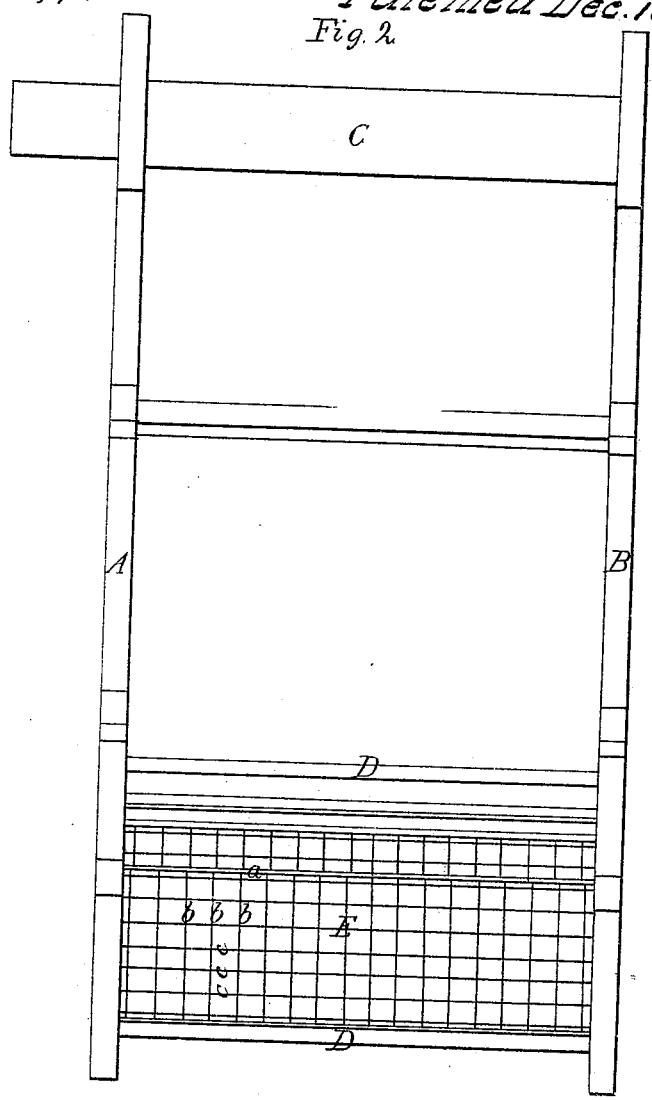

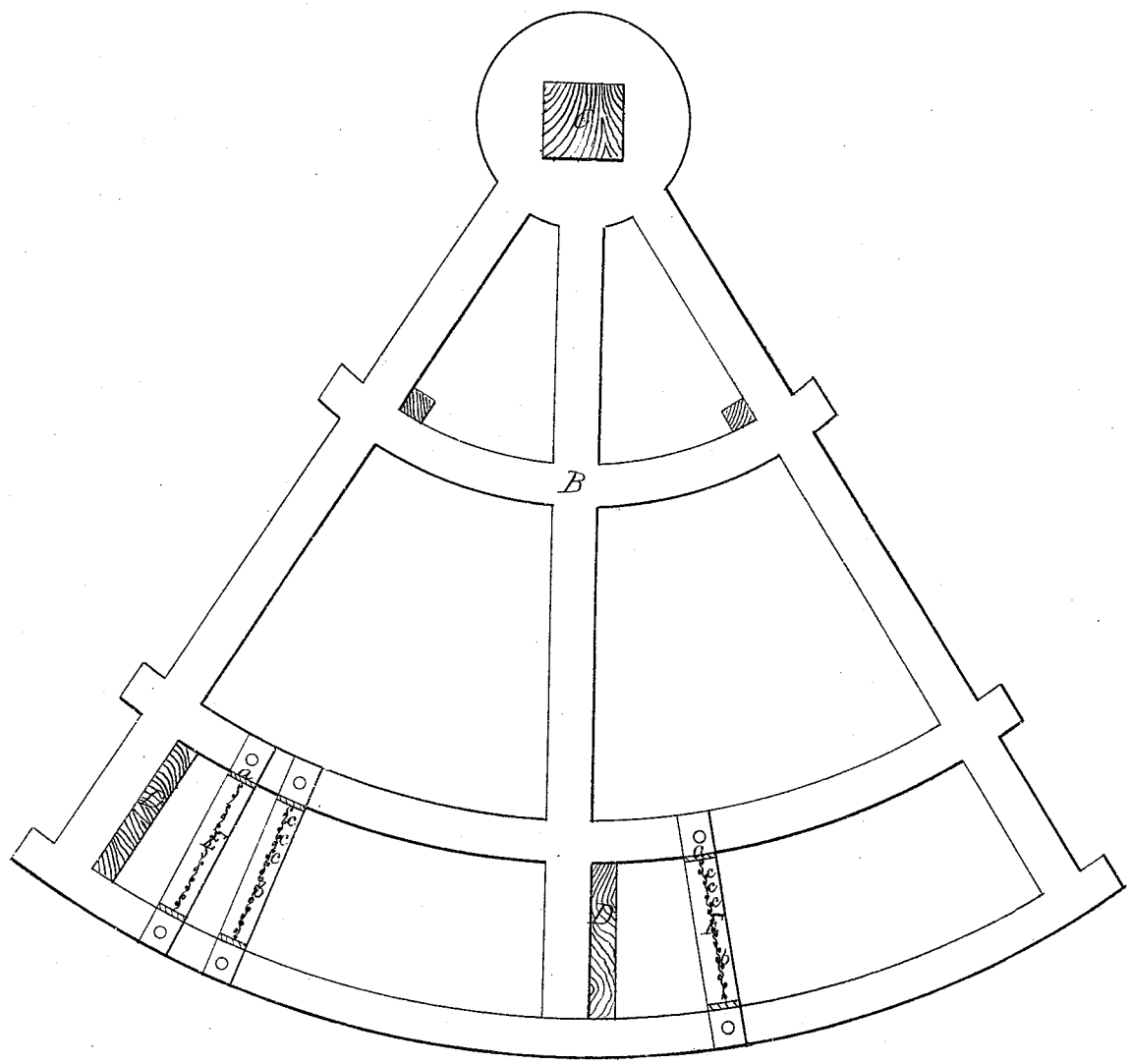

FREDERIC W. CAPEN, OF NEWTON, MASSACHUSETTS.

PADDLE-WHEEL.

Specification of Letters Patent No. 13,940, dated December 18, 1855.

*To all whom it may concern:*

Be it known that I, FREDERIC W. CAPEN, of Newton, county of Middlesex, and State of Massachusetts, have invented a new and useful Improvement in Paddle-Wheels or Propellers for Navigable Vessels; and I do hereby declare that the same is fully described and represented in the following specification and the accompanying drawings, of which—

Figure 1, denotes a side view of a sectoral portion of a paddle wheel containing my improvements. Fig. 2, is an end view of the same. Fig. 3, is a vertical and central section taken at right angles to the axis of the shaft of the wheel.

The nature of my invention consists in what I term a "skeleton paddle or alleviator" placed in front of and combined with each or any paddle or float of the wheel, the object of the same being to relieve the said float or paddle from a sudden blow or concussion on its entering the water.

In the drawings A, B, are sectoral portions of the frame of a common paddle wheel, they being affixed to a shaft G, and made to carry floats or paddles D, D, extended from one to the other or arranged at or near their peripheries or rims as seen in the drawings. Directly in front of each of these paddles or floats, and a short distance therefrom, I arrange a skeleton paddle or alleviator E, which in the drawings is represented as being constructed of a rectangular frame *a*, and one or more series of bars *b*, *b*, *b*, *c*, *c*, *c*, interwoven with one another or interlaced so as to have meshes, orifices or spaces between them for the water to pass through when the alleviator is being moved through the water. I do not confine my invention to such particular mode of constructing the alleviator, as it may be made in various other ways, so as to have numerous spaces or passages through it, it being intended that it shall be so constructed with such spaces or passages as to break up or divide into numerous streams the mass of water against which it may impinge and immediately before the same may be struck by the paddle or float to which such alleviator may be applied. By means of such alleviator and the float acting in conjunction, the blow or impingement of the paddle or wheel on the water while passing through it, is effected without any of that sudden concussion and jar, which usually takes place in common paddle wheels, and is not only detrimental to the vessel and the machinery thereof, but very disagreeable to persons aboard of the vessel propelled by the wheel. Two or more of such alleviators may be applied in front of each paddle, or so as they may dip into or be caused to strike the water immediately preceding the entrance of the paddle, therein.

It will readily be seen that there may be instances where an alleviator such as has been above described, may be applied to advantage to either, each, or any blade or wing of a common screw propeller. Besides the advantage of diminution of shock, or concussion, by the use of my improvement, there result others; that is to say, it admits of a reduction of the number of paddles in a wheel, as it is well known that in the common wheel more paddles are generally used, than are required for propulsion, the extra paddles being needed to diminish the effect of the concussion with the water.

Among the incidental benefits arising from the use of the skeleton paddle may be named the better grasp of the solid paddle upon the water, owing to the partial confinement of water between the skeleton and solid paddle.

What I claim as my invention is—

The combination of one or more alleviators or skeleton paddles constructed essentially as described with each or any main paddle or float of a paddle wheel or propeller, the same being for the purposes as specified.

In testimony whereof I have hereunto set my signature this fifth day of November A D. 1855.

FREDERIC W. CAPEN.

Witnesses:
R. H. EDDY,
F. P. HALE, Jr.